May 21, 1935.  L. L. ENGLISH  2,002,054
ORCHARD HEATER
Filed Feb. 17, 1934   2 Sheets-Sheet 1

Inventor
L. L. ENGLISH
By Mason Fenwick Lawrence
Attorneys

May 21, 1935.  L. L. ENGLISH  2,002,054
ORCHARD HEATER
Filed Feb. 17, 1934   2 Sheets-Sheet 2

LESTER L. ENGLISH
By Mason Fenwick Lawrence
Attorneys

Patented May 21, 1935

2,002,054

UNITED STATES PATENT OFFICE 2,002,054

ORCHARD HEATER

Lester L. English, Spring Hill, Ala., assignor to Alabama Polytechnic Institute, Auburn, Ala.

Application February 17, 1934, Serial No. 711,799

9 Claims. (Cl. 126—59.5)

This invention relates to orchard heaters and has for its general object the provision of a heater of the class described designed to impart heat to the trees by radiation rather than by convection.

A more specific object of the invention is the provision of a heater constructed to burn the fuel from surfaces exposed to the exterior of the heater and thereby to continuously provide a luminous heat radiant fuel body.

Another object of the invention is to provide a heater in conjunction with reflectors for concentrating or directing radiant heat in any direction and within any desired limits.

A further object of the invention is the provision of an orchard heater which can be cheaply constructed, easily serviced and conveniently stored.

Other objects of the invention will appear as the following description of a preferred and practical embodiment thereof proceeds.

In the drawings which accompany and form a part of the following specification and throughout the several figures of which the same characters of reference have been employed to designate identical parts:

Figure 1:
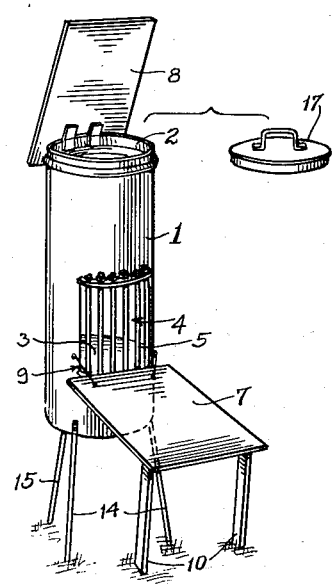
Figure 1 is a perspective view of an orchard heater embracing the principles of the present invention.
Figure 2:
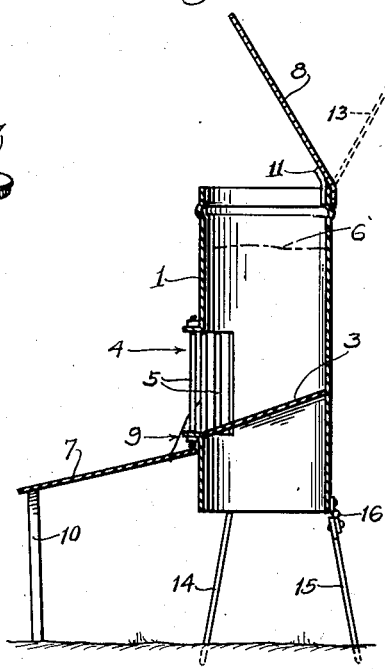
Figure 2 is a side sectional view.
Figure 3:
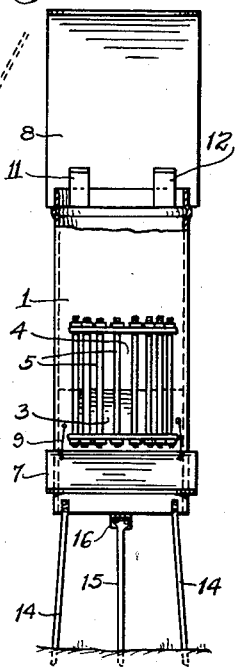
Figure 3 is a front elevation.

Referring now in detail to that form of the invention shown in Figures 1, 2 and 3, the numeral 1 represents a drum of sheet metal or the like constituting a combustion chamber. This drum has an open top 2 and an imperforate bottom 3. The front of the drum is provided near the bottom with an extensive opening 4 and said opening is intersected by a plurality of vertical rods 5 forming a grate. Any other form of grate is equally acceptable to the invention.

It is preferred that the combustion chamber be of uniform diameter from the bottom to the top or at any rate that there be no obstruction to intercept vertically ascending radiant rays from the entire body of fuel in the combustion chamber. It will be understood that the combustion chamber is designed to be filled with any suitable fuel as for example, coke or coal briquettes, to any desired height for example, as indicated at 6 in Figure 2. The fuel will be ignited either from the front or top and the front opening 4 is the draft inlet for the combustion chamber. Thus the fuel when fully ignited will present a glowing surface to the opening 4 radiating heat in straight lines and through a wide angle in all directions forwardly of said opening. After the body of fuel has burned sufficiently to become incandescent on its upper surface, radiant beams emanate vertically from the top of the combustion chamber. These beams are controlled and directed by means of either one or both of the reflectors 7 and 8, the former being placed in front of and slightly below the opening 4. Truly directed radiant heat beams which would otherwise be lost in the ground adjacent the heater, strike the reflector 7 and are directed upwardly and forwardly toward the trees.

The reflector 7 is preferably detachable and is shown attached to the heater by a hook 9 engaging one of the grate bars and being supported at its forward end upon legs 10. The upper reflector 8 when in position is normally inclined over the open end of the combustion chamber so as to catch the upwardly ascending luminous heat beams and to reflect them forwardly in the direction of the trees. The reflector 8 is detachably connected to the upper edge of the drum 1 by means of lugs 11 and 12, one of which would be sufficient for the purpose of the invention, which lugs being spaced from the reflector form slots which telescope over the free edge of the drum 1. Since upon starting the fire in the combustion chamber some smoke or volatile matter will issue from the top of the combustion chamber, it is desirable to arrange the reflector in the reverse position shown in dotted lines at 13, so as to prevent its bright surface being obscured by soot.

After the fire has burned for sometime, the attendant may reverse the position of the reflector bringing it to the normal full line position shown at 8.

Figure 3 shows that the bottom 3 of the combustion chamber slopes upwardly from the opening 4 toward the back of the heater, keeping the fuel moving to the front and facilitating the traverse of the draft to the back part of the mass of fuel. A sloping bottom is not however essential to the invention.

The drum 1 is suitably supported upon legs 14 in front and 15 in the rear. The legs 15 are preferably hingedly connected to the drum as shown at 16 so that their angularity can be changed and the entire drum tilted upwardly if desired for directing the radiant heat beam as may be desired.

It is of course well known that the earliest type of orchard heater or "smudge pot" was designed to produce a dense cloud of smoke which was intended to hover over and among the trees and to prevent the loss by radiation of the natural heat of the earth acquired from the sun during the daytime. Such smudge pots were only effective on still nights as the smudge was quickly blown away if there was an appreciable breeze. Very little of the heat emitted by the smudge pots was available for useful purposes since the heat rose by convection vertically to a level above the trees and was carried away by the prevailing breeze. Radiant heat is not affected by the wind. It always accompanies light and like light travels in straight lines. The present heater is not of the smudge pot type and is designed particularly to avoid a greater proportion of convection heat than is merely required to support combustion. It is with this end in view that the bottom of the burner is imperforate and that the draft is admitted through the opening in the front.

Under these conditions, at least 75% of the heat energy is the radiant type and this by use of the reflectors can be most efficiently utilized by concentrating it upon the area of the trees, permitting practically none of it to be wasted in the open sky or against the ground.

By virtue of the reflectors 7 and 8 being detachable, the orchard heater may be conveniently stored in a small space when not in use. It is preferably provided with a lid 17 fitting upon the open upper end of the drum 1 and designed to protect the fuel in the heater from dampness when the heater is in the orchard, but not in use. When starting a fire in the heater the lid 17 can be set loosely upon the top of the drum 1 giving any desired degree of opening necessary for combustion. When the reflector 8 is in use however, the lid 17 is removed entirely and preferably placed upon the ground beneath the heater where it will not easily become mislaid.

Figure 4:
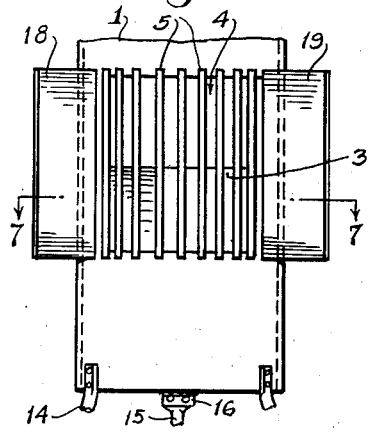
Figure 4 is a front elevation showing a modified form of the invention providing lateral reflectors.
Figure 7:
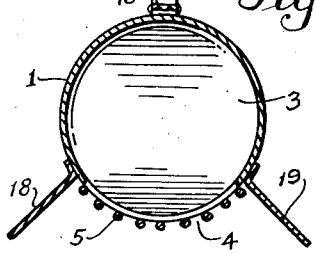
Figure 7 is a cross section taken along the line 7—7 of Figure 4.

Figures 4 and 7 show a modified form of the invention in which lateral reflectors 18 and 19 are positioned at the sides of the opening 4 and flaring outwardly. These further restrict and concentrate the reflected beam.

Figure 5:
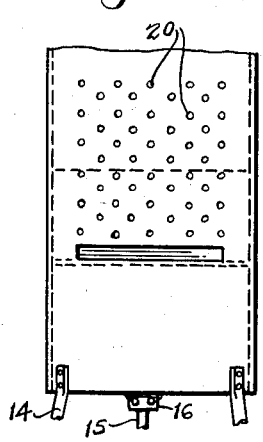
Figure 5 is a similar view showing still another form of the invention.

An alternative form of grate is shown in Fig. 5 in which the area defining the opening 4 is constituted by a plurality of holes 20. This is, of course, not as efficient a construction as the more open grate bars shown in the first described form of the invention.

Figure 6:
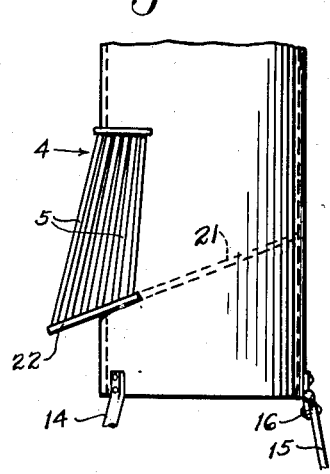
Figure 6 is a side elevation in detail showing another modification of the invention.

In Figure 6 a form of the invention is shown in which the bottom 21 of the combustion chamber extends beyond the confines of the drum 1 forming an extension 22. The grate bars 5 slope outwardly as shown, connecting at their lower ends to the periphery of the extension 22. This has the effect of projecting the fuel body beyond the bounds of the drum 1 and exposing a convex surface of the fuel body to the trees, considerably widening the angle of radiation.

Figure 8:
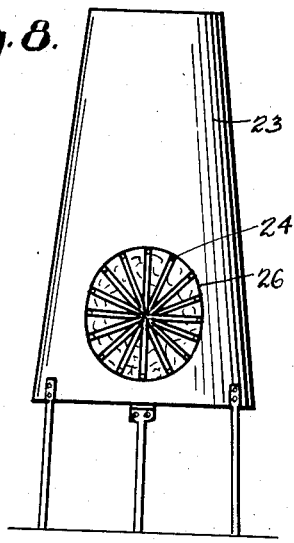
Figures 8 and 9 are respectively front elevation and side sectional views of a modified form of the invention in which the lower radiating surface has the form of a conical grate.
Figure 9:
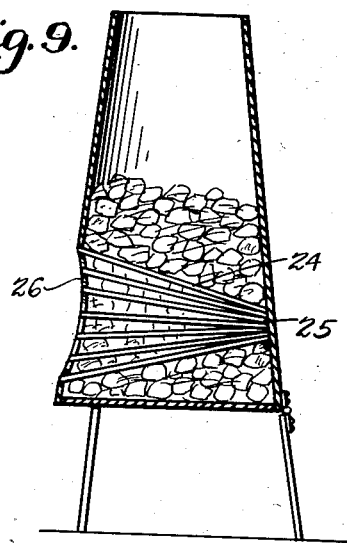

In Figures 8 and 9, a form of the invention is illustrated which embodies the principle that the maximum of heat radiation is obtained from a conical surface. The combustion chamber 23 is in this form of the invention shown as frusto-conical in form although this is a mere variant of the cylindrical shape shown in Figure 1 and does not materially affect the invention. The lower radiating surface is composed of a plurality of grate bars 24 convergently arranged transversely within the combustion chamber so as to constitute a conical cage the small end 25 of which is suitably affixed to the remote wall of the combustion chamber, while the bars at the larger end are secured around the periphery of the draft opening 26.

The coke or briquettes surround the conical cage and when ignition is at its height the entire conical surface glows with heat, radiating not only from between the bars 24, but from the bars themselves which become incandescent. Since the entire surface of the cone is bright, the heat from the remote portion of the conical surface is reflected one or more times from the forward portions of said surface before being radiated outwardly toward the trees. Thus the radiated heat is intense, being a concentration of the heat of the remoter portions of the conical surface.

Figure 10:
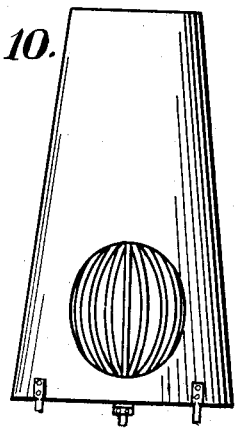
Figures 10 and 11 illustrate still another modification of the invention in which the radiating surface is hemispherical.
Figure 11:
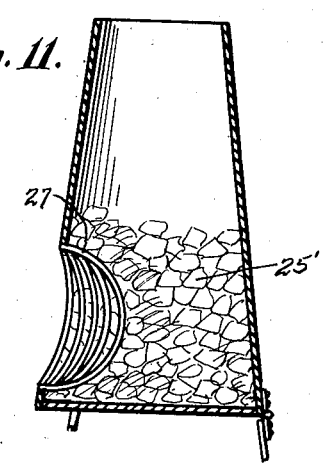

Since there may be some disadvantage in dividing the fuel body as must be done in that form of the invention which has just been described, a concave spherical arrangement of grate bars 27 is suggested in Figures 10 and 11. The focus of reflection from all parts of the hemispherical surface is a point embraced in the plane of the front wall of the burner so that all heat radiated from the grate bars 27 and between them is made available for radiation to the trees. The body of fuel 25 extends back of the radiation chamber defined by the hemispherical grate bars in an unbroken mass, thus ensuring complete and intense combustion of the fuel.

Figure 12:
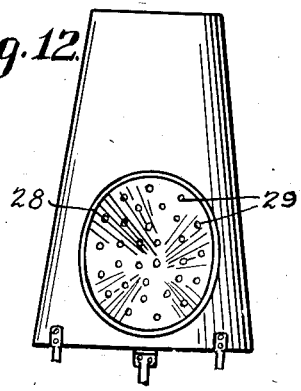
Figures 12 and 13 are respectively a front elevation and a side sectional view of still another modification of the invention in which the lower radiating surface is in the form of a solid cone, the apertures being provided principally for draft purposes.
Figure 13:
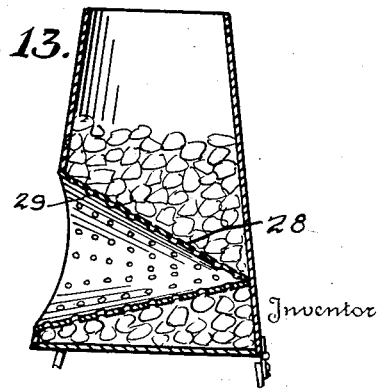

In that form of the invention shown in Figures 12 and 13, a sheet metal cone 28 is employed for the radiating surface, the same being perforated as at 29 in the interest of the admission of air to sustain the combustion. This form of the invention is quite similar to that shown in Figures 8 and 9 excepting that the incandescence assumed by the sheet metal itself is relied upon for the major portion of the radiation. In all of these forms of the invention it is to be understood that radiation also takes place from the open top of the burner when combustion is at its height.

While I have in the above specification described what I believe to be preferred and practical forms of my invention, it is to be understood that the details of construction as shown and described are merely by way of example and not to be construed as limiting the scope of the invention as claimed.

What I claim is:

1. An orchard heater comprising means forming a combustion chamber open at the top, having an opening in its front, and having an imperforate bottom sloping upward from the lower portion of the opening in the front, said opening serving as the draft inlet for the combustion chamber, and means for tiltably mounting said combustion chamber for directing the radiant heat beam emanating from said open front in any desired direction and fuel retaining grate means across said opening providing for radiation of heat therefrom.

2. A radiant orchard heater comprising a metallic combustion chamber having a radiation opening in front, and a perforated conical wall providing a radiating surface arranged transversely within said combustion chamber having its large end adjacent the said radiation opening and its convergent end adjacent the remote wall of said combustion chamber.

3. A radiant orchard heater comprising means forming a combustion chamber having a radiation opening in front, and a conical grate arranged transversely within said combustion chamber having its larger end adjacent said front opening and its smaller end adjacent the remote wall of said chamber.

4. A radiant orchard heater comprising a combustion chamber and having an opening in its front, and means forming an outwardly concave hemispherical grate arranged within said combustion chamber and across the opening, the latter permitting heat radiating outwardly from a fire bed within said combustion chamber.

5. A radiant orchard heater comprising a metallic container having an imperforate bottom adapted to support fuel and having an open top for introduction of fuel and exit of gases, said container having an opening in its front extending above said bottom, said container being otherwise imperforate, and a fuel retaining grate extending across said opening to provide for combustion of fuel and radiation of heat therefrom.

6. A radiant orchard heater comprising a metallic container having an imperforate bottom adapted to support fuel and having an open top for introduction of fuel and exit of gases, said container having an opening in its front extending above said bottom, said container being otherwise imperforate, and a substantially conical fuel retaining grate extending inwardly from the periphery of said opening to provide for the combustion of fuel and radiation of heat therefrom.

7. A radiant orchard heater comprising a metallic container having an imperforate bottom adapted to support fuel and having an open top for introduction of fuel and exit of gases, said container having an opening in its front extending above said bottom, said container being otherwise imperforate, and a substantially spherical fuel retaining grate extending inwardly from the periphery of said opening to provide for combustion of the fuel and radiation of heat therefrom.

8. A radiant orchard heater comprising a metallic container having an imperforate bottom adapted to support fuel and having an open top for introduction of fuel and exit of gases, said container having an opening in its front extending above said bottom, said container being otherwise imperforate, and a fuel retaining grate consisting of metallic bars spaced apart across said opening and extending lengthwise of the container to provide for combustion of the fuel and radiation of heat therefrom.

9. A radiant orchard heater comprising an upright cylindrical metallic container having an imperforate bottom adapted to support fuel and having an open top for introduction of fuel and exit of gases, said container having an opening in its front extending above said bottom, said container being otherwise imperforate, and upright metallic bars spaced apart across said opening to form a substantially semi-cylindrical fuel retaining grate to provide for the combustion of fuel and radiation of heat therefrom.

LESTER L. ENGLISH.